United States Patent Office 3,637,745
Patented Jan. 25, 1972

3,637,745
N-(β-CYANOVINYL)-INDOLINES
Karl-Heinz Heller, Moers, Manfred Kreuder, Krefeld, and Karl Merz, Leverkusen, Germany, assignors to Farbenfabriken Bayer Aktiengesellschaft, Leverkusen, Germany
No Drawing. Filed May 29, 1967, Ser. No. 642,132
Claims priority, application Germany, June 15, 1966,
F 49,471
Int. Cl. C07d 27/38
U.S. Cl. 260—326.11    4 Claims

ABSTRACT OF THE DISCLOSURE

This invention relates to ultraviolet absorbers based on a series of substituted N-phenylaminoethylene compounds.

It is known from U.S. patent specification No. 3,079,366 that substituted arylaminoethylenes corresponding to the general formula:

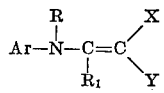

can be used as ultraviolet light absorbers and as protecting agents for various materials, particularly synthetic plastics, which can be damaged by ultraviolet rays. Unfortunately, most of these substances have an absorption maximum at a wave-length below 330 millimicrons. When worked into synthetic plastics, they only absorb ultraviolet light up to a wave-length of around 370 millimicrons, with the result that UV rays of longer wavelength are let through and may damage the plastics material or the material present beneath it. In addition, they only show a limited fastness to light.

We have now found that a substituted N-phenylaminoethylene corresponding to the general formula:

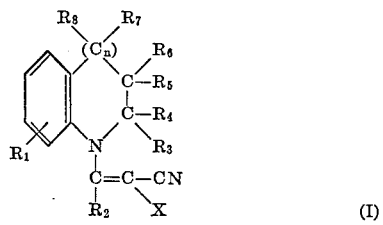

in which $R_1$ represents hydrogen or one or more lower alkyl or alkoxy radicals containing preferably 1 to 3 carbon atoms, or halogen, in particular chlorine; $R_2$ represents hydrogen or a lower alkyl radical with from preferably 1 to 3 carbon atoms; $R_3$ to $R_8$ are the same or different and may represent hydrogen or lower alkyl radicals with from preferably 1–4 carbon atoms and alternatively $R_4$ and $R_5$ may be linked together so as to form another 5- or 6-membered ring; $n$ is 0 or 1 preferably 0; and X represents the cyano group or a —COOR, —CONHR or —CONR$_2$ group in which R represents hydrogen or a lower alkyl radical with from preferably 1 to 12 carbon atoms which may be monovalent or polyvalent, in which case the structure of the general Formula I is repeated in accordance with the valency of the polyvalent hydroxy or amino compound, is particularly suitable as an ultraviolet light absorber.

The compound (I) are believed to be novel, being distinguished from conventional compounds in that they contain nitrogen as a constituent of a ring condensed on the phenyl nucleus. The unexpected effect of this difference is that the novel phenylaminoethylenes show a much greater fastness to light than the art compounds such as those described in U.S. patent specification No. 3,079,366. It is this property of fastness to light, however, that is so very important if the compounds in question are to be successfully used as UV light absorbers. It is also particularly surprising that, despite their similar molecular structure, due to the development of the ring condensed on the phenyl nucleus, the novel compounds according to the invention absorb at much longer wave-lengths, so that they are more suitable for use as UV light absorbers.

If, for example, the absorption maximum of the compound:

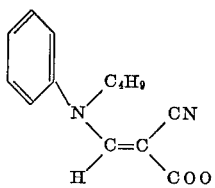

From U.S. Patent No. 3,079,366 (305 millimicrons), $\lambda_{max}$.

is compared with that of the following compound according to the invention:

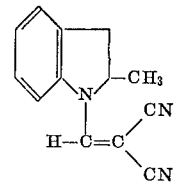

($\lambda_{max}$ 335 millimicrons.)

or the absorption maximum of the compound:

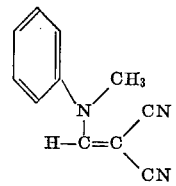

From U.S. Patent 3,079,366 (302 millimicrons), $\lambda_{max}$.

is compared with that of the following compound according to the invention,

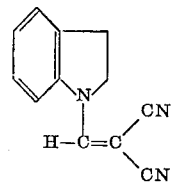

($\lambda_{max}$. 3.34 millimicrons.)

it is found that the maximum is bathochromically displaced by 30–35 millimicrons in the case of the compounds according to the invention.

The novel compounds of the invention have a high molecular extinction coefficient (E), whilst their absorption maxima lie in the range of from about 3200 A. to 3500 A., which is favourable for UV light absorbers, particularly in the fairly narrow range of from 3300 A. to 3450 A. The absorption curves of the new phenylaminoethylenes show such a steep decline to the long-wave UV-range that those substances with absorption maxima between 3300 A. and 3500A. are almost colourless. The compounds according to the invention are satisfactorily compatible in the individual synthetic plastics. In addition, they may readily be adapted to satisfy special requirements for the individual plastics materials by varying the radicals in the general formula.

The novel compounds may be prepared by conventional processes for example, by reacting amines corresponding to the general formula:

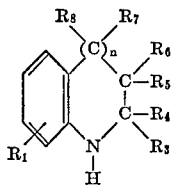

either with orthocarboxylic acid esters and CH-acid compounds corresponding to the general formula

$$NC-CH_2-X \qquad (III)$$

accompanied by the elimination of three mols of alcohol, or with vinylethers corresponding to the general formula:

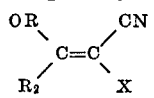

accompanied by the elimination of 1 mol of alcohol; in the above formulae, $n$ and the radicals $R_1-R_8$ are as earlier defined, whilst R represents a lower alkyl radical with from 1 to 4 carbon atoms of the kind common to orthocarboxylic acids. The reactions may be carried out in the presence of or in the absence of solvents.

The following are examples of amines corresponding to the general Formula II above:

Indoline and 1,2,3,4-tetrahydroquinoline, their monomethyl derivatives such as 2-methylindoline,
3-methylindoline,
4-methylindoline,
7-methylindoline,
2-methyl-1,2,3,4-tetrahydroquinoline,
3-methyl-1,2,3,4-tetrahydroquinoline,
4-methyl-1,2,3,4-tetrahydroquinoline,
5-methyl-1,2,3,4-tetrahydroquinoline,
6-methyl-1,2,3,4-tetrahydroquinoline,
7-methyl-1,2,3,4-tetrahydroquinoline and
8-methyl-1,2,3,4-tetrahydroquinoline;

Their dimethyl derivatives such as 2,3-dimethylindoline,
3,3-dimethylindoline,
2,5-dimethylindoline,
2,7-dimethylindoline,
2,2-dimethyl-1,2,3,4-tetrahydroquinoline,
2,3-dimethyl-1,2,3,4-tetrahydroquinoline,
2,4-dimethyl-1,2,3,4-tetrahydroquinoline,
3,4-dimethyl-1,2,3,4-tetrahydroquinoline,
4,4-dimethyl-1,2,3,4-tetrahydroquinoline,
5,7-dimethyl-1,2,3,4-tetrahydroquinoline and
6,8-dimethyl-1,2,3,4-tetrahydroquinoline;

Their trimethyl derivatives such as 2,3,3-trimethylindoline,
2,3,7-trimethylindoline,
2,2,4-trimethyl-1,2,3,4-tetrahydroquinoline,
2,3,4-trimethyl-1,2,3,4-tetrahydroquinoline,
2,4,4-trimethyl-1,2,3,4-tetrahydroquinoline,
2,4,6-trimethyl-1,2,3,4-tetrahydroquinoline,
2,4,7-trimethyl-1,2,3,4-tetrahydroquinoline,
2,4,8-trimethyl-1,2,3,4-tetrahydroquinoline,
2,6,8-trimethyl-1,2,3,4-tetrahydroquinoline;

Their tetramethyl derivatives such as 2,2,3,3-tetramethylindoline and
2,4,5,8-tetramethyl-1,2,3,4-tetrahydroquinoline;

Their ethyl derivatives such as 2-ethylindoline,
3-ethylindoline,
5-ethylindoline,
2-ethyl-1,2,3,4-tetrahydroquinoline,
3-ethyl-1,2,3,4-tetrahydroquinoline,
8-ethyl-1,2,3,4-tetrahydroquinoline;

and their propyl and butyl derivatives such as 2-propyl-1,2,3,4-tetrahydroquinoline and
2-isobutyl-1,2,3,4-tetrahydroquinoline;

Their derivatives with different alkyl radicals such as 2-methyl-2-ethyl indoline,
3-methyl-3-propylindoline,
2,3-dimethyl-6-ethylindoline,
2-ethyl-3-methyl-1,2,3,4-tetrahydroquinoline,
5-isopropyl-8-methyl-1,2,3,4-tetrahydroquinoline and
6-butyl-2,8-dimethyl-1,2,3,4-tetrahydroquinoline; and Their alkoxy derivatives such as 4-methoxyindoline, 6-methoxyindoline,
5,6,7-trimethoxyindoline,
2-methyl-6-methoxyindoline,
2,3,3-trimethyl-5-methoxyindoline,
6-methoxy-1,2,3,4-tetrahydroquinoline,
7-methoxy-1,2,3,4-tetrahydroquinoline,
8-methoxy-1,2,3,4-tetrahydroquinoline,
6,7-dimethoxy-1,2,3,4-tetrahydroquinoline,
6,7,8-trimethoxy-1,2,3,4-tetrahydroquinoline,
8-ethoxy-1,2,3,4-tetrahydroquinoline,
8-propoxy-1,2,3,4-tetrahydroquinoline,
8-isopropoxy-1,2,3,4-tetrahydroquinoline,
8-butoxy-1,2,3,4-tetrahydroquinoline,
8-isobutoxy-1,2,3,4-tetrahydroquinoline,
5,6-dimethoxy-2,4-dimethyl-1,2,3,4-tetrahydroquinoline,
5,8-dimethoxy-2,4-dimethyl-1,2,3,4-tetrahydroquinoline,
5,6,7-trimethoxy-2,4-dimethyl-1,2,3,4-tetrahydroquinoline,
6,7,8-trimethoxy-2,4-dimethyl-1,2,3,4-tetrahydroquinoline,
orthoacetic acid and trimethyl ester, and Their halogen derivatives such as 4-chloroindoline,
5-chloroindoline,
6-chloroindoline,
6-chloro-1,2,3,4-tetrahydroquinoline,
5-chloro-2,6-dimethyl-1,2,3,4-tetrahydroquinoline,
7-chloro-2,6-dimethyl-1,2,3,4-tetrahydroquinoline,
5-chloro-4,6-dimethyl-1,2,3,4-tetrahydroquinoline,
7-chloro-4,6-dimethyl-1,2,3,4-tetrahydroquinoline,
5-chloro-6,8-dimethyl-1,2,3,4-tetrahydroquinoline,
7-chloro-6-methyl-1,2,3,4-tetrahydroquinoline,
5-chloro-2,6,8-trimethyl-1,2,3,4-tetrahydroquinoline,
5-chloro-2,4-6-trimethyl-1,2,3,4-tetrahydroquinoline and
7-chloro-2,4,6-trimethyl-1,2,3,4-tetrahydroquinoline.

1,2,3,4,10,11 - hexahydrocarbazole is mentioned as an example of the case in which $R_4$ and $R_5$ in the general formula are attached together, thereby forming another ring.

The number of indoline and 1,2,3,4-tetrahydroquinoline derivatives listed above can be enlarged by preparing further derivatives of the general Formula II through the reduction of corresponding indoles or quinolines of dihydroquinolines.

The following are examples of orthocarboxylic acid esters: orthoformic acid trimethyl ester, orthoformic acid triethyl ester, orthoformic acid tripropyl ester, orthoformic acid tributyl ester, orthoacetic acid trimethyl ester, orthoacetic acid triethyl ester, orthopropionic acid trimethyl ester, orthopropionic acid triethyl ester and orthobutyric acid triethyl ester.

The following are examples of OH-acid compounds corresponding to the general Formula III:

Malonic acid dinitrile, cyanoacetic acid methyl ester, cyanoacetic acid ethylester, cyanoacetic acid propyl ester, cyanoacetic acid butyl ester, cyanoacetic isobutyl ester, cyanoacetic acid pentyl ester, cyanoacetic acid hexylester, cyanoacetic acid heptyl ester, cyanoacetic acid octyl ester, cyanoacetic acid isooctyl ester, cyanoacetic acid nonyl ester, cyanoacetic acid decyl ester, cyanoacetic acid undecyl ester, cyanoacetic acid dodecyl ester, cyanoacetic acid amide, cyanoacetic acid methylamide, cyanoacetic acid dimethyl amide, cyanoacetic acid ethylamide, cyanoacetic acid diethylamide, cyanoacetic acid propyl amide, cyanoacetic acid dipropylamide, cyanoacetic acid butyl amide, cyanoacetic acid dibutylamide and in cases in which R in the group —COOR, CONHR, or CONR$_2$ is polyvalent, ethylene-bis-cyanoacetic ester, trimethylene-bis-cyanoacetic ester, tetramethylene-bis-cyanoacetic ester, pentamethylene-bis-cyanoacetic ester, hexamethylene-bis-cyanoacetic ester and corresponding amides.

Light-sensitive materials which may with advantage be protected against the damaging influence of ultra-violet light in accordance with the invention include, for example, synthetic plastics such as polyvinyl chloride, polyvinylidene chloride, polystyrene, polycarbonates, polyacrylates, alkyd resins, polyamides, polyethylenes and polypropylene, as well as mouldings and coatings of polyurethanes lacquers, alkyd resins and unsaturated polyester resins, natural materials such as paper, wood, cotton and so on, or their conversion products such as cellulose esters or nitrocellulose, optionally in the form of films, foils, filaments, fibres or other mouldings, as well as foodstuffs, dyestuffs, and the like.

The protecting agents may either be worked into the materials to be protected against the effect of ultra-violet rays or be added to protective coatings such as protective films or foils for their materials.

The concentration in which these compounds are present may, for example, be up to 10% by weight, although it is usually between approximately 0.1% and approximately 2% by weight.

They may be worked in by various processes, for example, by spraying, or by addition to molten, suspended or dissolved polymeric compounds during their processing, optionally together with other additives such as plasticisers, antioxidants and auxiliary stabilisers, even at elevated temperature. If desired, the UV-absorbing agents may even be added to the starting materials used to produce the polymers, for example melts, solutions or suspensions. They do not suffer any loss in their absorption capacity, even in the presence of other conventional light or heat stabilizers, oxidising agents, reducing agents and so on.

The preparation of the substances according to the invention, their fastness to light and their application are described in the following examples.

EXAMPLE 1

(a) 162.8 parts by weight of orthoformic acid triethyl ester, 66.0 parts by weight of malonic acid dinitrile and 133.0 parts by weight of 2-methylindoline are poured into 250.0 parts by weight of ethanol with stirring, and the resulting mixture is heated for one hour under reflux. As a result, the reaction mixture turns orange-brown in colour, crystals being precipitated. After cooling to 0° C., the crystals are suction-filtered and recrystallised once from 800 parts by weight of butanol in the presence of active carbon. 164 parts by weight (78% of the theoretical) of N-($\beta,\beta$ - dicyanovinyl)-2-methylindoline are obtained, M.P. 153°–154° C.

(b) 116.6 parts by weight of orthoformic acid trimethyl ester, 99.0 parts by weight of cyanoacetic acid methylester and 133.0 parts by weight of 2-methylindoline are combined and heated in a distillation apparatus equipped with a 40–60 cm. Vigreux column. The temperature is raised to 160° C. over a period of 3 hours, around 90 parts by weight of methanol being distilled off. The residue is fractionated in vacuo. 160 parts by weight of N-($\beta$-cyano-$\beta$-carbo-methoxyvinyl) - 2 - methylindoline are obtained, B.P.$_{0.3}$ 180° C.–190° C. After dissolution in 300 parts by weight of methanol, the substance is crystallised on cooling. 121 parts by weight are obtained following suction-filtration and washing with methanol, M.P. 98–99° C.

(c) 141 parts by weight of $\beta$-methoxy-$\alpha$-cyanoacrylic acid methyl ester are dissolved in 300 parts by weight of toluene and the resulting solution is combined while stirring with a solution of 147 parts by weight of 2-methyl-1,2,3,4-tetrahydroquinoline in 150 parts by weight of toluene. The mixture is heated under reflux for 2 hours, and 180 parts by weight of solvent are then distilled off over a distillation bridge. On cooling, N-($\beta$-cyano-$\beta$-carbomethoxyvinyl)-2-methyl-1,2,3,4-tetrahydroquinoline crystallises out in almost pure form. 212 parts by weight (83% of the theoretical) are obtained after suction-filtration and washing with toluene. M.P. 119–120° C.

EXAMPLE 2

A large number of compounds can be produced in accordance with the methods described in Examples 1(a), 1(b) and 1(c) by using the various indolines or tetrahydroquinolines and the various CH-acid compounds and orthocarboxylic acid esters and even the various substituted vinylethers.

Further substances are listed in the following. Their absorption maximum was measured in solution in methanol and their molar coefficient of extinction (E) was calculated from the absorption at the absorption maximum.

| | $\lambda_{max.}$ (millimicrons) | $\epsilon$, litre mol | Cm. |
|---|---|---|---|
| (a) N-($\beta$-cyano-$\beta$-carbomethoxyvinyl)-indoline | 344 | 21 | 500 |
| (b) N-($\beta,\beta$-dicyanovinyl)-indoline | 334 | 31 | 900 |
| (c) N-($\beta$-cyano-$\beta$-carbomethoxyvinyl)-2-methylindoline | 335 | 32 | 200 |
| (d) N-($\beta$-cyano-$\beta$-carbomethoxyvinyl)-2,3,3-trimethylindoline | 334 | 44 | 500 |
| (e) N-($\beta$-cyano-$\beta$-carbomethoxyvinyl)-2,3,3-trimethyl-5-methoxy indoline | 340 | 28 | 000 |
| (f) N-($\beta$-cyano-$\beta$-carbethoxyvinyl)-2-methylindoline | 335 | 35 | 700 |
| (g) N-($\beta$-cyano-$\beta$-carbo-n-butoxyvinyl)-2-methylindoline | 333 | 33 | 600 |
| (h) N-($\beta$-cyano-$\beta$-carbo-n-octyloxyvinyl)-2-methylindoline | 332 | 34 | 500 |
| (i) N-($\beta$-cyano-$\beta$-carboisooctyloxyvinyl)-2-methylindoline | 337 | 30 | 700 |
| (j) N-($\beta,\beta$-dicyanovinyl)-2-methylindoline | 335 | 31 | 500 |
| (k) N-($\beta$-cyano-$\beta$-carboxamidovinyl)-2-methyl indoline | 338 | 28 | 900 |
| (l) N-($\beta$-cyano-$\beta$-carbomethylamidovinyl)-2-methyl indoline | 334 | 36 | 700 |
| (m) N-($\beta$-cyano-$\beta$-carboxdimethylamidovinyl)-2-methyl indoline | 334 | 31 | 200 |
| (n) N-($\beta$-cyano-$\beta$-carbomethoxyvinyl)-1,2,3,4,10,11-hexahydrocarbazole | 335 | 32 | 700 |
| (o) N-($\beta$-cyano-$\beta$-carbo-n-butoxyvinyl)-1,2,3,4,10,11-hexahydrocarbazole | 334 | 32 | 900 |
| (p) N-($\beta$-cyano-$\beta$-carbo-n-octyloxyvinyl)-1,2,3,4,10,11-hexahydrocarbazole | 334 | 33 | 300 |
| (q) N-($\beta$-cyano-$\beta$-carbomethoxyvinyl)-1,2,3,4-tetrahydroquinoline | 320 | 33 | 200 |
| (r) N-($\beta$-cyano-$\beta$-carbomethoxyvinyl)-1,2,3,4-tetrahydroquinoline | 318 | 29 | 200 |
| (s) Butane-1,4-diol-bis-[$\beta$-N-(2-methyl-2,3-dihydroindole)-$\alpha$-cyanoacrylic acid ester] | 337 | 51 | 800 |
| (t) N-($\alpha$-methyl-$\beta$-cyano-$\beta$-carbomethoxyvinyl)-2-methylindoline | 344 | 18 | 600 |

EXAMPLE 3

(a) 25 parts by weight of dibutyl phthalate and 25 parts by weight of butylbenzylphthalate are added as plasticisers to 165 parts by weight of collodion wool dissolved in 230 parts by weight of alcohol (denat.) 270 parts by weight of acetone, 270 parts by weight of ethylene glycol and 15 parts by weight of butanol. The solution is poured onto a glass plate.

(b) 1 part by weight of N-($\beta$-cyano-$\beta$-carbethoxyvinyl)-2-3,3-trimethyl-5-methoxyindoline is added to and dissolved in a lacquer solution of the kind described at (a) above. The solution is poured onto a glass plate.

(vc) 1 part by weight of N-($\beta,\beta$-dicyanovinyl-p-nitroaniline is added to, and dissolved in, a lacquer solution of the kind described at (a) above. The solution is poured onto a glass plate.

After drying, the lacquer coatings have a layer thickness of around 50μ. Purely externally, there is no difference between the lacquer films (a) and (b). The film (c) is pale yellow in colour. The films (b) and (c) absorb UV-light up to a wave-length of 390 nm. After 4 months exposure to daylight or 500 hours under a xenon lamp, the film (b) containing N-(β-cyano-β-carbomethoxyvinyl-) 2,3,3-trimethyl-5-methoxyindoline is still completely elastic and shows only a trace of yellowing, whilst the film (a) without any additive turns yellow-brown in colour and the film (c) containing N-(β-β-dicyanovinyl)p-nitroaniline turns a rich yellow in colour. Both these latter films suffered a considerable reduction in elasticity. If, in the film (b), 1 part by weight of butane-1,4-diol-bis-[β,N-(2-methylindoline)-α-cyanoacrylic acid ester] is used instead of 1 part by weight of N-(β-cyano-β-carbomethoxyvinyl)-2,3,3-trimethyl-5-methoxyindoline, similar results are obtained.

EXAMPLE 4

(a) 65 parts by weight of a polyvinylchloride emulsion polymer with a K-value of 72–76 are rolled with 36 parts by weight of dioctyl phthalate and 2 parts by weight of a polymeric organic tin stabiliser with a sulphur bridge, for some 5 to 7 minutes at 160°–170° C. on low-friction heating rollers adjusted to various gap widths. The resulting sheet is drawn into a film 0.3 mm. thick on a four-roll calender.

Another 5 films are similarly prepared using:

(b) 0.25 part by weight of N-(β-cyano-β-carbomethoxyvinyl)-2-methylindoline (c) 0.25 part by weight of N-(β-cyano-β-carboxymethoxyvinyl)-indoline (d) 0.25 part by weight of N-(β-cyano-β-carbethoxyvinyl)-2-methylindoline (e) 0.25 part by weight of N-(β-cyano-β-carbethoxyvinyl-p-methoxyaniline (f) 0.25 part by weight of N-(β-acetyl-β-carbethoxyvinyl)-3-chloroaniline In daylight, there is visually no difference between the films although they do differ in their permeability to UV light. Whereas the film (a) without appropriate additives lets through all the UV-rays present in daylight, the films (b), (c), (d) and (f) screen UV-rays up to 390 nm. and the film (e) up to 375 nm. Following the exposure to light of the films (a) to (f), the following changes were apparent.

Visually, they are completely transparent and absorbent to UV-light, whilst the wafers without any additives and those containing N-(β,β-dicarbethoxyvinyl)-aniline have become highly permeable to UV-rays.

Similar absorption results are obtained by replacing the 0.2 part by weight of N-(β-cyano-β-carbobutoxyvinyl)-2-methylindoline in (a) by N-(β-cyano-β-carbethoxyvinyl)-2-methyl indoline or N-(β-cyano-β-carbomethoxyvinyl)-indoline.

EXAMPLE 6

(a) 100 parts by weight of polyvinyl chloride and 3 parts by weight of barium-cadmium stearate are rolled to form a sheet on heating rollers.

(b) A sheet is prepared as described at (a), except that 0.2 part by weight of N-(β-cyano-β-carboethoxyvinyl)-1,2,3,4,10-11-hexahydrocarbazole is added.

(c) A sheet is prepared as described at (a), except that 0.2 part by weight of N-(β-cyano-β-carboethoxyvinyl)-N-p-methoxyaniline is added.

The sheets are then rolled into a transparent sheet at around 130° C.–140° C. and under a pressure of 5 kg./cm.$^2$. Visually, there is no difference between the light-permeated sheets. The additive-containing sheets, however, absorb UV-light, sheet (b) up to 390 millimicrons and sheet (c) up to 360 millimicrons wavelength. After exposure to daylight (for about 4 months) or irradiation with a xenon lamp (500 hours), there was no change either in the surface or in the UV-ray absorption of sheet (b). By contrast, the PVC sheet (a) without any additives is slightly more brittle than the sheet (c), pale yellow in colour and more permeable to UV rays.

If the N-(β-cyano-β-carbomethoxyvinyl)-1,2,3,4,10,11-hexahydrocarbazole in (b) is replaced by hexamethylene-1,6-diamine-bis[β-N-(2-methylindoline) - α - cyanoacrylamide], similar results are obtained.

EXAMPLE 7

0.2 part by weight of N-(β-cyano-β-carbon-octyloxyvinyl)-2-methylindoline or 0.2 part by weight of N-(β-cyano-β-carboisooctyloxyvinyl)-2-methylindoline is worked on heating rollers into 100 parts by weight of a polyethylene injection-moulding composition at a temperature of around 150° C. The composition is injection-moulded

|      | Appearance of the films after— | | UV-absorption of the films after— | |
| --- | --- | --- | --- | --- |
| Film | 4 months in daylight | 500 hours under a xenon lamp | 4 months in daylight | 500 hours under a xenon lamp. |
| a | Traces of yellow | Traces of yellow | Traces of grey, completely permeable. | Traces of grey, completely permeable. |
| b | Almost unchanged | Almost unchanged | Unchanged UV-absorption | Unchanged UV-absorption. |
| c | do | do | do | Do. |
| d | do | do | do | Do. |
| e | Traces of yellow | Traces of yellow | Highly permeable to UV-light | Highly permeable to UV-light. |
| f | do | do | do | Do. |

EXAMPLE 5

(a) 0.2 part by weight of N-(β-cyano-β-carbobutoxyvinyl)-2-methylindoline are added to 100 parts by weight of a polystyrene granulate, and the resulting mixture is rolled for around 5 minutes on heating rollers adjusted to different gap widths. The resulting sheet is granulated.

(b) As described at (a) above, a granulate is prepared from 100 parts by weight of a polystyrene granulate and 0.2 part by weight of N-(β,β-dicarbethoxyvinyl)aniline, a product in which the nitrogen is not a constituent of a ring.

The granulates are injection-moulded at around 250° C. into stepped wafers 1 to 3 mm. thick. The wafers thus produced are no different in daylight from those produced similarly in the absence of the aforementioned additives although, in case (a), they screen UV-rays up to wave-lengths of 390 millimicrons and, in case (b), up to wave-lengths of 370 millimicrons. After 4 months' exposure to daylight, or after 500 hours' irradiation with a xenon lamp, the wafers containing N-(β-cyanocarbobutoxyvinyl)-2-methyl indoline show no change in their screening effect against UV-light.

into stepped wafers 1 to 3 mm. thick at a temperature of around 230° C. Externally, the injection mouldings are no different from those without the afore-mentioned additive, although they absorb UV-rays up to a wave-length of 395 millimicrons. After 6 months exposure to day-light or after 500 hours under a xenon lamp, there is no decrease in the UV-absorption and the test specimens also remain unchanged in comparison with the slightly yellowed samples without the additive.

EXAMPLE 8

1 part by weight of N - (β-cyano-β-carbomethoxyvinyl)-1,2,3,4-tetrahydroquinaldine is added to a lacquer of 87 parts by weight of cellulose acetate containing 54.5% of acetic acid, 142 parts by weight of toluene, 143 parts by weight of methyl glycol acetate, 43 parts by weight of ethyl acetate, 320 parts by weight of methyl acetate, 65 parts by weight of methanol, 71 parts by weight of diacetone alcohol and 30 parts by weight of dimethyl glycol phthalate. The lacquer is poured onto a glass plate so that a film approximately 0.75μ in thickness is formed. Visually, there is no difference between this film and a film without the additive, although it does absorb UV-light up to a wavelength of 375 millimicrons. After 6 months' exposure to daylight or 500 hours under a xenon lamp, the UV-absorption of the film containing N-($\beta$ - cyano - $\beta$-carbomethoxyvinyl)-1,2,3,4, tetrahydroquinaldine is still the same, and there is no change in its clarity, whilst the film without the additive is slightly yellowed.

Similar results were obtained by dissolving the same quantity by weight of N - ($\alpha$-cyano-$\beta$-carboethoxyvinyl)-2,7-dimethylindoline in the lacquer instead of the N-($\beta$-cyano - $\beta$ - carbomethoxyvinyl) - 1,2,3,4 - tetrahydroquinaldine.

EXAMPLE 9

100 parts by weight of freshly distilled methyl methacrylate and 0.1 part by weight of lauryl peroxide are heated under reflux for 10 to 15 minutes at 140° C., until there is a marked increase in the viscosity of the solution. The solution is then poured between two smoothly polished surfaces (glass) is separated by a gap of around 2 mm., and is left for 15 hours at around 70° C. until a completely transparent crystal-clear sheet of high stability under load is formed.

Purely externally, there is no difference between this sheet and one additionally containing 0.1 part by weight off N-($\beta$-cyano-$\beta$-carbomethoxyvinyl) - 1,2,3,4 - tetrahydroquinoline or N - ($\beta$-cyano-$\beta$-carbomethoxyvinyl) - 6-chloroindoline.

By adding 0.1% of N - ($\beta$ - cyano-$\beta$-carbomethoxyvinyl) - 1,2,3,4 - tetrahydroquinoline or N-($\beta$-cyano-$\beta$-carbomethoxyvinyl)-6-chloroindoline, the plate becomes almost impermeable to UV-rays, forming a protective UV-filter for objects lying behind it. In addition, sheets of this kind are faster to light and show less tendency to yellow than sheets without this additive.

EXAMPLE 10

100 parts by weight of polymethacrylate and 0.1 part by weight of N-($\beta$-cyano-$\beta$-carbomethoxyvinyl) - 2,3,3-trimethyl indoline are rolled into a continuous sheet on heating rollers heated to 180° C., the resulting sheet is cooled and granulated into spheres about the size of peas, and is injection-moulded into wafers approximately 2 mm. thick at a temperature of around 200–220° C. The wafers are as transparent and clear as those without any N-($\beta$ - cyano-$\beta$-carbomethoxyvinyl) - 2,3,3 - trimethylindoline, although they are almost completely impermeable to UV-rays. Their tendency to yellow is limited.

N-($\beta$-cyano-$\beta$ - carboxidibutylamidovinyl) - 2,3,3-dimethyl indoline has a similar inhibiting effect against the action of UV rays.

EXAMPLE 11

100 parts by weight of polypropylene and 0.1 part by weight of N-($\beta,\beta$-dicyanovinyl) - 2 - methylindoline are rolled into a continuous sheet on heating rollers heated to 180° C.–190° C., and the resulting sheet is granulated into spheres about the size of peas and injection-moulded into smooth wafers. The wafers are smooth, transparent and are externally no different from a wafer without any N-($\beta,\beta$-dicyanovinyl) - 2 - methylindoline. The injection mouldings containing this additive, however, are much more stable to light and weather-resistant, and are almost completely impermeable to UV-rays.

N-($\beta,\beta$ - dicyanovinyl) - 2 - methylindoline provides a filter for the selective removal of UV-light up to a wavelength of around 385 mm. N - ($\beta$-cyano-$\beta$-carbisooctyloxy)-vinyl-2-methylindoline may be used in place of N-($\beta,\beta$-dicyanovinyl)-2-methylindoline to produce a similar effect.

EXAMPLE 12

100 parts by weight of a PVC suspension polymer with a K-value of 75–78 are rolled into a continuous sheet with 2 parts by weight of barium cadmium stearate and 0.5 part by weight of a stabiliser based on dibutyl tin dilaurate on heating rollers heated to around 160° C. to 170° C., and the resulting sheet is moulded into a transparent sheet approximately 3 mm. thick under a pressure of 40–50 kg./cm.$^2$. If 0.1 part by weight of N - ($\beta$-cyano-$\beta$-carboxymethylaminovinyl) - 2 - methylindoline is added to the mixture before processing on the heating rollers, an equally transparent sheet is obtained after moulding at elevated temperature and pressure, the only difference being that this sheet is impermeable to UV-rays and forms a protective filter for goods lying behind it. In addition, the sheet containing N-($\beta$-cyano-$\beta$ - carboxmethylaminovinyl) - 2 - methyl-indoline is faster to light and more weather-resistant than that without any additive. A similar effect as regards UV-absorption and improved light and weather resistance is obtained by using N - ($\beta$ - cyano-$\beta$-carboxamido-vinyl)-2-methylindoline, N - ($\beta$ - cyano-$\beta$-carboxdimethylamidovinyl - 2 - methylindoline, N-($\alpha$-methyl-$\beta$-cyano-$\beta$-carbomethoxyvinyl) - 2-methylindoline or N-($\beta$-dicyanovinyl)-indoline.

EXAMPLE 13

20.0 parts by weight of alkyl resin (60% in xylene), 3.0 parts by weight of dioctyl phthalate and 3.0 parts by weight of castor oil are added to a mixture of 15.3 parts by weight of collodion wool (55% butanol, moist) in 7.5 parts by weight of ethyl acetate, 19.0 parts by weight of butyl acetate, 4.0 parts by weight of ethyl glycol, 23.4 parts by weight of toluene and 3.0 parts by weight of butanol and are uniformly distributed therein by dissolving 0.1 part by weight of N-($\beta$-cyano-$\beta$-carbo-n-butoxyvinyl) - 1,2,3,4,10,11 - hexahydrocarbazole. The films obtained by applying the solutions (brush coating) and drying are almost completely impermeable to UV-rays up to a wave-length of 380 millimicrons, and may thus be regardless as UV-filters. Their permeability to visible light is not influenced by the addition of N-($\beta$-cyano - $\beta$ - carbo-n-butoxyvinyl) - 1,2,3,4,10,11-hexahydrocarbazole, although their fastness to light and their weather resistance are considerably improved. N - ($\beta$-cyano-$\beta$-carbo-n-octyloxyvinyl) - 1,2,3,4,10,11 - hexahydrocarbazole may be similarly used for protection against UV-rays.

EXAMPLE 14

1.0 part by weight of N-($\beta$-cyano-$\beta$-carbo-n-octyloxyvinyl)-1,2,3,4,10,11-hexahydrocarbazole is dissolved in 400 parts by weight of an approximately 9.0% hydroxylgroup containing polyester of phthalic acid/adipic acid with a diol (e.g. butane diol) and a triol (e.g. hexane triol), 188 parts by weight of ethylglycol acetate, 180 parts by weight of butyl acetate, 80 parts by weight of butyl acetate, and a mixture of 580 parts by weight of a 75% aliphatic and/or aromatic polyisocyanate solution in 280 parts by weight of toluene added shortly before processing.

A transparent, scratch-resistant film which is almost completely impermeable to UV-rays is obtained by brush-coating onto wood or other substrates, followed by drying. The film is fast to light and weather-resistant and shows less tendency towards yellowing than one which does not contain any N-($\beta$-cyano-$\beta$-carbo-n-octyloxyvinyl)-1,2,3,4,10,11-hexahydrocarbazole.

What we claim is:

1. A compound of the formula

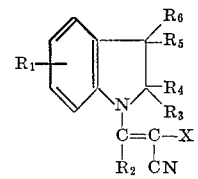

wherein $R_1$ is hydrogen, chlorine or one or more alkyl or alkoxy moieties containing from 1 to 3 carbon atoms; $R_2$ is hydrogen or alkyl containing from 1 to 3 carbon atoms; $R_3$–$R_6$ are hydrogen or alkyl containing from 1 to 4 carbon atoms and X is cyano, —COOR, —CONHR, —CONRR or —COOR' wherein R is hydrogen or alkyl containing from 1 to 12 carbon atoms and R' is

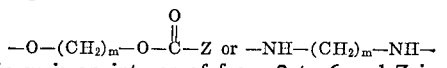

wherein $m$ is an integer of from 2 to 6 and Z is of the formula

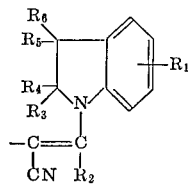

wherein $R_1$–$R_6$ are as aforesaid.

2. N-(β-cyano-β-carbomethoxyvinyl)-2-methyl indoline.
3. N-(β-cyano-β-carbo-n-octyloxyvinyl)-2-methyl indoline.
4. N-(β-cyano-β-carboisooctyloxyvinyl)-2-methyl indoline.

References Cited
UNITED STATES PATENTS
3,079,366   2/1963   Boyle et al. _____ 260—45.9

ALEX MAZEL, Primary Examiner

J. A. NARCAVAGE, Assistant Examiner

U.S. Cl. X.R.

106—176; 252—300; 260—45.8 N, 283 CN, 289 R, 315